Figure 1:
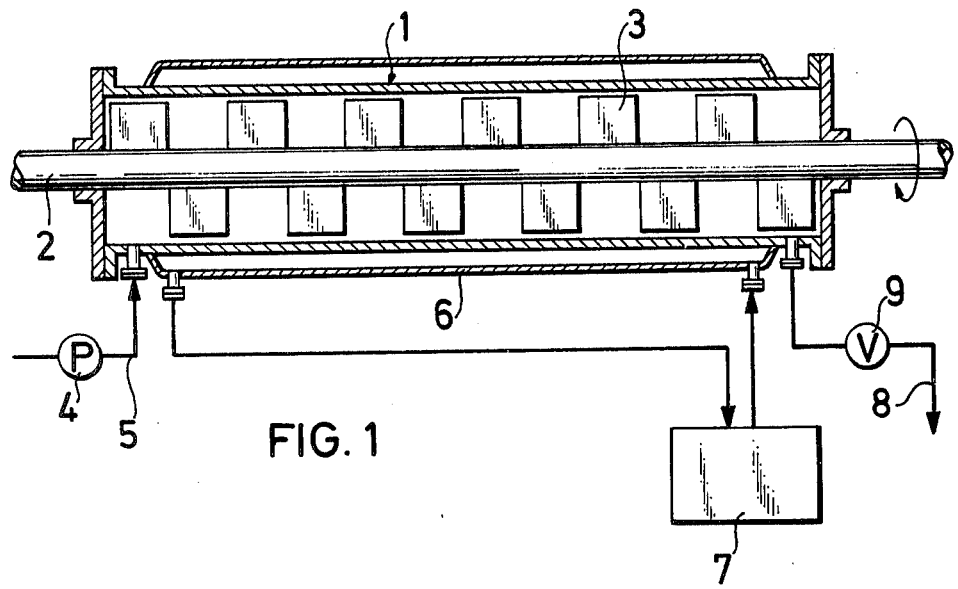

United States Patent [19]

Deubel et al.

[11] 4,156,617
[45] May 29, 1979

[54] PROCESS FOR PREPARING ORGANIC PIGMENTS OF HIGH TINCTORIAL STRENGTH AND GRAIN SOFTNESS

[75] Inventors: Reinhold Deubel, Altenhain; Erich Dietz, Kelkheim; Werner Pasche, Kronberg; Rolf Staal, Frankfurt am Main, all of Fed. Rep. of Germany

[73] Assignee: Hoechst Aktiengesellschaft, Frankfurt am Main, Fed. Rep. of Germany

[21] Appl. No.: 873,620

[22] Filed: Jan. 30, 1978

Related U.S. Application Data

[63] Continuation of Ser. No. 746,115, Nov. 30, 1976, abandoned, which is a continuation-in-part of Ser. No. 575,067, May 6, 1975, abandoned.

[30] Foreign Application Priority Data

May 8, 1974 [DE] Fed. Rep. of Germany ....... 2422182

[51] Int. Cl.² ............................................. C09B 67/00
[52] U.S. Cl. ................................ 106/309; 106/288 Q; 165/94
[58] Field of Search ............................. 106/309, 288Q; 260/314.5; 165/94

[56] References Cited

U.S. PATENT DOCUMENTS

| 1,977,582 | 10/1934 | Hanahan | 106/309 |
| 2,964,532 | 12/1960 | Klenke | 260/314.5 |
| 4,077,972 | 3/1978 | Baurecht et al. | 260/314.5 |

FOREIGN PATENT DOCUMENTS

| 1239042 | 4/1967 | Fed. Rep. of Germany. | |
| 2214700 | 7/1973 | Fed. Rep. of Germany. | |
| 2336919 | 1/1975 | Fed. Rep. of Germany | 260/314.5 |

OTHER PUBLICATIONS

Perry et al., Chem. Eng. Handbook, 5th ed., (1973), pp. 19-21 and 19-22.
Twin-Screw Compounding Extruder Type ZSK 53/variable, pub. by Werner-Pfleiderer.
Sales and Spec'n, Pamphlets on AP (All-Phase) Reactors of List, (German Language Portion is 1973, Pub'n).

*Primary Examiner*—Helen McCarthy
*Attorney, Agent, or Firm*—Curtis, Morris & Safford

[57] ABSTRACT

An improved process for preparing an organic pigment having a high tinctorial strength by heating a crude organic pigment as an aqueous suspension having a consistency suitable for being pumped, to a temperature of from 80° to 300° C. and for a period of from 10 seconds to 20 minutes in a continuously operating flow apparatus which is shaped as a heat exchanger provided with moving internal elements.

1 Claim, 2 Drawing Figures

U.S. Patent    May 29, 1979    4,156,617

PROCESS FOR PREPARING ORGANIC PIGMENTS OF HIGH TINCTORIAL STRENGTH AND GRAIN SOFTNESS

This application is a continuation of copending application Ser. No. 746,115 filed Nov. 30, 1976, now abandoned, which application Ser. No. 746,115 was a continuation-in-part of copending application Ser. No. 575,067, filed May 6, 1975, now abandoned.

The present invention relates to a process for preparing organic pigments which have a high tinctorial strength and grain softness.

German Auslegeschrift No. 2,214,700 relates to a process for preparing color-intense organic pigments by heating an aqueous suspension of an organic crude pigment having a consistency suitable for being pumped in a continuously operating flow apparatus to a temperature of from 80° to 300° C. for a period of from 10 seconds to 20 minutes.

It has now been found that, instead of using a flow apparatus, the continuous pressure finish of the aqueous pigment suspension can also be carried out using a continuously operating heat exchanger provided with moving internal elements. Such a heat exchanger provided with moving internal elements also allows pigment suspensions or pigment pastes having a substantially higher pigment concentration to be processed than those according to the process disclosed in the said German reference.

The process of the invention can be carried out with particular advantage using any pressure-tight, cylindrical heat exchanger which is provided with one or more shafts or screws rotating or vibrating in its interior and which may also have stirring elements fixed on the moving parts or on its walls (for example scrapers, wipers, fins, bars, rods, and so on), thus assuring a thorough mixing of the highly concentrated pigment pastes and, due to this and to a simultaneous self-cleaning effect of the heat exchanger surfaces, a good heat transfer. Further advantages are the low pressure loss in the apparatus and the possibility of increasing the heat exchange surface in a rational manner by internally heating the moving parts and thus raising the throughput of product. Since the product is discharged as a hot suspension or paste, the heat energy contained therein can be used for removing the liquid suspension medium, thus considerably reducing the drying energy. The concentration of the pigment pastes ranges from about 10 to 30 percent by weight. Thus, usual press-cakes can be processed directly.

A precise control of the finishing process, which is possible by purposefully varying the temperature of the pigment suspension and its residence time in the apparatus, is the necessary condition for a rationalized pressure finish process of pigments. This allows, for example, to change the physical conditions of the finish process without interrupting it and makes it possible to produce one portion of the charge differently than the rest.

The compact arrangement of the heat exchanger of the invention offers not only an easy maintenance, but also the advantage of reduced cost compared to conventional pressure finishing apparatus (large-volume stirrer containers, coils of pipe, pipe assembly exchangers) as well as increased operational safety of the apparatus, due to an only small volume under pressure, allowing automatic operation.

Since relatively high temperatures can be maintained in most cases it is not necessary to use an organic solvent as the liquid suspension medium. It is evident that water is much more economic and favorable since it does not involve ecological problems and safety risks.

Owing to a very uniform dwelling time of the material particles, the thermal treatment of aqueous pigment pastes in the heat exchangers of the invention yields products having valuable technological properties, especially a narrow grain size distribution, which properties are better reproduceable than in prior known processes.

Despite the low volume being under pressure the throughput is relatively high. Thus, the space-time-yields are excellent without any negative influence on the product quality which even generally is improved due to the uniform conditions.

The percentages given in the following Examples are by weight, the temperatures are given in centigrades. The dwelling times are calculated from the product throughput and the volume of the heat exchanger used, in which the heating and cooling zones are advantageously arranged in one apparatus, one immediately behind the other, according to a variable mechanical assembly technique. The pressures required depend on the temperature chosen and should always be above the saturation vapor pressure.

EXAMPLE 1

In a ring-gap heat exchanger (FIG. 1) formed by two slim concentric cylinders (1) and (2), of which the inner one (2) rotated and carried mobile wipers (3) on its circumference to shear the product without conveying it, a 20 % aqueous paste of the crude pigment obtained by coupling anthranilic acid-n-butyl ester with 5-(2'-hydroxy-3'-naphthoylamino)-benzimidazolone was introduced by means of the pump (4) via line (5) into the space between cylinders (1) and (2) and was heated (by the heating jacket (6) and the heating device (7)) under pressure to 170° C. for 6 minutes. The dwelling time and the pressure were regulated by the pressure difference between inlet (5) and outlet (8) which contained a pressure-regulating device (valve, vent, throttle, capillary) (9). A pigment powder was obtained which had the same qualities as those obtained by conventional methods only after a several-hour heating to 150° C. with the addition of o-dichlorobenzene (cf. German Patent Specification No. 1,217,008).

EXAMPLE 2

Figure 2:
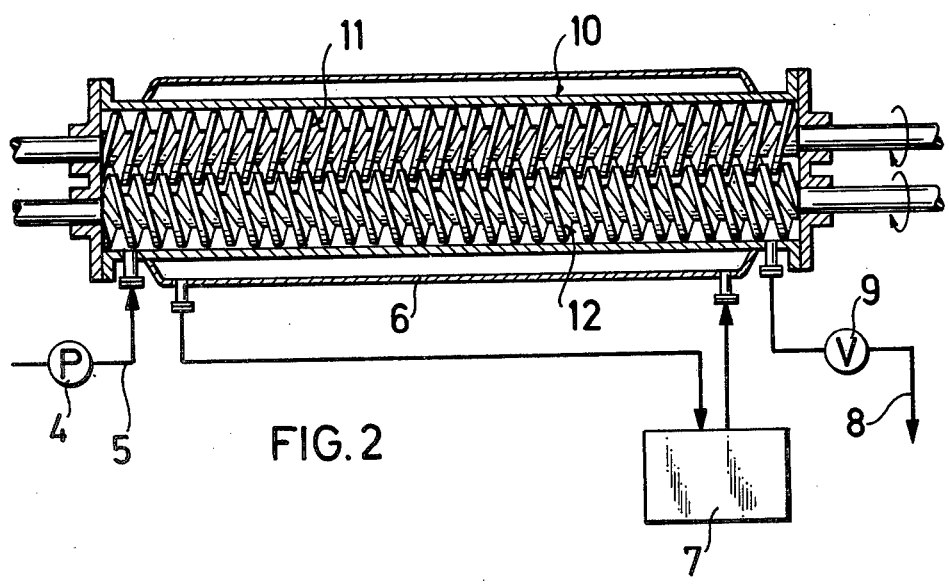

In this case, a cylindrical finishing apparatus (FIG. 2) (10) was used which was provided with two screws (11) and (12) adequately arranged in such a manner that they necessarily cleaned themselves and simultaneously the internal wall of the cylinder (10). The active conveying effect on the product and thus the dwelling time of the pigment suspension could be varied via the rotational speed of the screws. In this apparatus, a 25% paste of the crude pigment obtained by diazotization of anthranilic acid and coupling with 5-acetoacetylamino-benzimidazolone (according to German Offenlegungsschrift No. 1,939,466) was introduced by means of pump (4) via line (5) and was heated (by the heating jacket (6) and the heating device (7)) under pressure to 160° C. for 8 minutes. Since the screws (11) and (12) conveyed the product, the pressure-regulating device (9) in line (8) could be omitted. A well-dispersible pigment powder was obtained which differed from a product obtained hitherto by 2.5-hour heating to 150° C. in an increased tinctorial strength and a higher gloss of the lacquered articles produced therewith.

EXAMPLE 3

A crude aqueous pigment suspension containing 22% of the product obtained by diazotizing 4-chloro-2-nitraniline and coupling it onto 5-acetoacetylamino benzimidazolone-(2) was fed into the apparatus described in Example 1. In the course of 3 minutes the suspension was heated to 180° and processed at a throughput of 200 kg per hour. The finished pigment had a very narrow grain size distribution and showed a high tinctorial strength and brillancy.

EXAMPLE 4

The process of Example 3 was modified by heating the suspension to 200°. The product so-obtained has a substantially higher covering power than that of Example 3. The tinctorial strength is still higher than that of the same pigment which is finished discontinually. In a pilot plant of the apparatus of Example 1 the volume under pressure is 37 liters. A throughput of 200 kg of the suspension of Examples 3 and 4 (of 22% pigment concentration) per hour means a yield of 1056 kg of pigment per day. Thus, the space-time-yield is 28.5 kg per liter pressure volume and day.

In a conventional finish procedure a 5% pigment suspension is heated in a kettle of 40 m$^3$ which is filled with 20,000 kg of suspension. Although the finish time is only 4 to 5 hours, filling, heating up, cooling and discharging require a total of about 12 hours (2 shifts per day). Thus, per day 2000 kg of pigment are processed in a pressure volume of 40 m$^3$, i.e. the space-time-yield is 0.05 kg/liter and day, i.e. about 0.2% of that of the continuous process according to this invention.

Analogous to Examples 1 to 4 numerous other pigments can be finished, especially azo pigments, e.g. the products obtained by diazotizing the following amines and coupling them onto 5-acetoacetylamino benzimidazolone-(2):
anthranilic acid,
2-trifluoromethyl aniline,
4-chloro-2-trifluoromethyl aniline,
3-amino-isophthalic acid dimethylester or
2-chloro-5-trifluoromethyl aniline, or by
diazotizing the following amines and coupling them onto 5-(2'-hydroxy-3'-naphthoylamino)-benzimidazolone-(2):
anthranilic acid,
1-amino-2,5-dimethoxybenzene-4-sulfonic acid-methyl amide or
5-nitro-2-amino-anisole.

We claim:

1. In a pressure finishing process for obtaining an organic pigment having a high tinctorial strength and a narrow grain size distribution, by heating a crude organic pigment as an aqueous suspension having a consistency suitable for being pumped in a continuously operating flow apparatus to a temperature of from 80° to 300° C. and for a period of from 10 seconds to 20 minutes, the improvement whereby pigment press-cakes can be processed directly which comprises heating the suspension of from about 10 to about 30% by weight of crude pigment in a pressure-tight, cylindrical heat exchanger which is provided with moving internal parts, said parts being in contact with said suspension and capable of thoroughly mixing said suspension and simultaneously self-cleaning the heat exchanger surfaces so that good heat transfer is achieved and so that a minimum and uniform dwelling time of the said aqueous suspension in the continuously operating flow apparatus is achieved.

* * * * *